US010209160B2

(12) United States Patent
Richards et al.

(10) Patent No.: US 10,209,160 B2
(45) Date of Patent: Feb. 19, 2019

(54) FATIGUE TESTING OF A WIND TURBINE BLADE

(71) Applicant: Vestas Wind Systems A/S, Aarhus N. (DK)

(72) Inventors: William David Richards, Ventnor (GB); Stuart Guy, Lockerley (GB); Malcolm Barnsley, Southampton (GB)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 15/514,126

(22) PCT Filed: Sep. 25, 2015

(86) PCT No.: PCT/DK2015/050293
§ 371 (c)(1),
(2) Date: Mar. 24, 2017

(87) PCT Pub. No.: WO2016/045684
PCT Pub. Date: Mar. 31, 2016

(65) Prior Publication Data
US 2017/0241860 A1    Aug. 24, 2017

(30) Foreign Application Priority Data
Sep. 26, 2014    (DK) .................................. 2014 70593

(51) Int. Cl.
*G01M 5/00*    (2006.01)
*G01M 7/06*    (2006.01)

(52) U.S. Cl.
CPC ........ *G01M 5/0075* (2013.01); *G01M 5/0016* (2013.01); *G01M 5/0066* (2013.01); *G01M 7/06* (2013.01)

(58) Field of Classification Search
CPC ..... G01M 5/0075; G01M 5/0066; G01M 7/06
(Continued)

(56) References Cited

U.S. PATENT DOCUMENTS

| 3,603,143 A * | 9/1971 | Detert | G01M 13/00 |
| | | | 73/794 |
| 2006/0037402 A1* | 2/2006 | Musial | G01M 7/00 |
| | | | 73/664 |

(Continued)

FOREIGN PATENT DOCUMENTS

| CN | 201408112 | 2/2010 |
| EP | 2522975 A2 * | 11/2012 .......... F03D 11/0091 |

(Continued)

OTHER PUBLICATIONS

Translation of Kinscherf, EP2741068A1.*
(Continued)

*Primary Examiner* — Lisa Caputo
*Assistant Examiner* — Nathaniel T Woodward
(74) *Attorney, Agent, or Firm* — Wood Herron & Evans LLP

(57) ABSTRACT

The application relates to an apparatus (100) for fatigue testing a wind turbine blade, and to a system and method using such an apparatus (100). The apparatus (100) comprises a base (110) for supporting a first end (12) of the wind turbine blade (10), and an edgewise actuator assembly (120). The edgewise actuator assembly (120) includes a ground-supported edgewise actuator (130) and a flexible cable assembly (140) for connecting the edgewise actuator (130) to the blade (10). The edgewise actuator (130) and the flexible cable assembly (140) are adapted to cyclically deflect the blade (10) relative to the base in the edgewise direction by repeatedly pulling the blade (10) in a substantially horizontal direction.

20 Claims, 6 Drawing Sheets

(58) Field of Classification Search
USPC .......................................................... 73/808
See application file for complete search history.

(56) References Cited

U.S. PATENT DOCUMENTS

| | | | |
|---|---|---|---|
| 2010/0175480 A1* | 7/2010 | Guy ................... | G01M 5/0016 |
| | | | 73/660 |
| 2012/0027515 A1 | 2/2012 | Neugent et al. | |
| 2013/0061683 A1* | 3/2013 | Baker ................ | G01M 5/0016 |
| | | | 73/834 |

FOREIGN PATENT DOCUMENTS

| | | | | |
|---|---|---|---|---|
| EP | 2741068 A1 * | 6/2014 | ......... | G01M 5/0016 |
| EP | 2741069 A1 * | 6/2014 | ......... | G01M 5/0016 |
| GB | 2548589 A * | 9/2017 | ......... | G01M 5/0016 |
| WO | 2004005879 A1 | 1/2004 | | |
| WO | 2009097049 A2 | 8/2009 | | |

OTHER PUBLICATIONS

Malhotra, P, Advanced Blade Testing Methods for Wind Turbines, M.S. Thesis, University of Massachusetts, Amherst; Sep. 2010, hhtp://scholarworks.umass.edu/theses/529/.
Danish Patent and Trademark Office, Search Report in PA 2014 70593, dated Apr. 24, 2015.
European Patent Office, International Search Report and Written Opinion in PCT Application Serial No. PCT/DK2015/050293, dated Dec. 11, 2015.

* cited by examiner

FATIGUE TESTING OF A WIND TURBINE BLADE

The present invention relates to an apparatus for fatigue testing of a wind turbine blade. In particular, the present invention relates to an apparatus for fatigue testing of a wind turbine blade comprising a base for supporting a first end of the wind turbine blade and an edgewise actuator assembly for cyclically deflecting the blade relative to the base in the edgewise direction. The present invention also relates to a method of fatigue testing a wind turbine blade.

Wind turbine blades are subjected to cyclical loading during use as a result of inertial loads and aerodynamic loads, such as lift and drag. These loads are experienced in both the edgewise and flapwise directions of the blade. The edgewise direction is perpendicular to the longitudinal axis of the blade and generally parallel to a plane extending through the leading and trailing edges of the blade and corresponds to the direction of rotation of the blade during use. The flapwise direction is perpendicular both to the edgewise direction and to the longitudinal axis of the blade. Such cyclical loading may cause weakening of the blades over the duration of their service life, eventually leading to fatigue failure. Fatigue testing is used to determine whether a particular blade design can withstand the expected cyclical operating loads without fatigue failure for the duration of the desired service life of the blade.

Fatigue testing is typically carried out by exciting the blade in the flapwise direction and in the edgewise direction to simulate flapwise and edgewise operating loads. For larger blades, these two fatigue tests are typically carried out consecutively. To simulate a typical service life, each test may involve subjecting a blade to one million or more fatigue loading cycles and can take several months to complete. To ensure that the results of the fatigue test are reliable, it is important for the cyclical loads applied during the test are representative of actual loading conditions.

Current blade fatigue testing methods include fixing the root end of a wind turbine blade to a stationary base so that the longitudinal axis of the blade is horizontal, and applying a cyclical load in either the edgewise direction, or the flapwise direction to deflect the blade in the edgewise or flapwise directions. For edgewise fatigue testing, the blade is typically mounted so that its edgewise direction, which extends between the leading and trailing edges of the blade, is substantially vertical. To make the test loading more representative of operating loads, small additional weights may be positioned along the length of the blade to provide an ideal bending moment distribution, this being a bending moment distribution that replicates the bending moment distribution experienced by such a blade during use.

It is known to fix a ground-supported hydraulic actuator to the blade and to excite the blade in either the flapwise direction or the edgewise direction by reciprocating the hydraulic actuator along a linear path. However, such arrangements can constrain the movement of the blade, making it difficult to represent actual loading during a fatigue test. It is also known to apply a cyclical load by mounting a rotating or reciprocating mass on the blade that is rotated or reciprocated by an actuator at a resonance frequency of the blade. Whilst providing effective driving of the blade, such an arrangement can over constrain the movement of the blade, preventing any movement departing from the pure edgewise/flapwise directions.

It would therefore be desirable to provide an apparatus and method for fatigue testing of a wind turbine blade which provides improved drive and is more representative of actual loading conditions.

SUMMARY OF THE INVENTION

According to a first aspect of the invention there is provided an apparatus for fatigue testing a wind turbine blade, the apparatus comprising a base for supporting a first end of the wind turbine blade such that the longitudinal axis and the edgewise direction of the blade are both substantially horizontal, and an edgewise actuator assembly comprising a ground supported edgewise actuator and a flexible cable assembly for connecting the edgewise actuator to the blade. The edgewise actuator and the flexible cable assembly are adapted to cyclically deflect the blade relative to the base in the edgewise direction, by repeatedly pulling the blade in a substantially horizontal direction.

With this arrangement, the edgewise actuator assembly does not rigidly constrain the blade to move along any particular path or paths during fatigue testing. Instead, the flexible cable assembly allows the blade to exhibit twisting and other movements as it would do during operation. This enables a more representative test As used herein, the term "cable" refers to any suitable elongate, flexible connection member, for example a cable, wire, rope, chain, ribbon, tape, strop, strap, sling, or any combination thereof.

As used herein, the term "flexible" is used to mean that the cable is easily bent without breaking. It includes cables which are extendible along their length, for example elastic cables, as well as cables which are substantially inextensible.

As used herein, the term "ground-supported" refers to a component which is supported on a surface which is fixed in relation to the base of the apparatus, either directly or indirectly via one or more intermediate elements. This includes, but is not limited to, components which are supported by the ground.

The flexible cable assembly may comprise a single length of cable which is attached at one of its ends to the edgewise actuator and which is adapted for connection to the blade at the other of its ends. Preferably, the flexible cable assembly comprises a first cable portion for connecting the edgewise actuator to a pressure side of the blade and a second cable portion for connecting the edgewise actuator to a suction side of the blade, in the manner of a bridle. With this arrangement, the flexible cable assembly can be connected to either side of the blade to provide more even load application. It also allows the flexible cable assembly to be attached to the pressure and suction sides of the blade adjacent the internal load bearing structure, which is the structurally strongest part of the blade profile, without inducing excessive twisting which might otherwise occur if the flexible cable assembly could be attached to only one of these sides.

The first and second cable portions may be formed from separate lengths of cable. In such embodiments, the separate lengths of cable may be connected to the edgewise actuator independently, or connected to each other and connected together to the edgewise actuator. Preferably, the flexible cable assembly comprises a first length of cable forming both the first cable portion and the second cable portion. This provides a more simple apparatus.

The flexible cable assembly may be connected directly or indirectly to the edgewise actuator. Where the flexible cable assembly comprises a first length of flexible cable forming both a first cable portion and a second cable portion, as discussed above, the first length of cable may be connected to the edgewise actuator such that the relative lengths of the first and second cable portions are fixed. Alternatively, the first length of cable may be connected to the edgewise actuator via an intermediate component, such as a slideable sheath, ring, or balance bar, that allows the relative lengths of the first and second cable portions to vary. Preferably, the flexible cable assembly further comprises a pulley connected to the edgewise actuator and wherein the first length of cable extends around the pulley such the first length of cable is divided into the first and second cable portions by the pulley. The pulley provides a simple means by which the respective lengths of the first and second portions of cable can vary as the blade oscillates during the test to balance the tension between the first and second cable portions and thus reduce twisting or jerking of the blade.

The pulley may be connected to the edgewise actuator directly or indirectly. For example, the pulley may be connected to the edgewise actuator indirectly via one or more intermediate components, which may be rigid or flexible. In certain embodiments, the flexible cable assembly comprises a second length of flexible cable by which the pulley is connected to the edgewise actuator.

The pulley may be suspended between the first length of flexible cable and the edgewise actuator without being in contact with the ground or a ground surface. Alternatively, the pulley may be mounted on a moveable structure, such as a support frame or arm that is moveable with respect to a ground surface, for example by sliding along the ground surface. Preferably, the pulley is mounted on a moveable arm, the moveable arm being pivotally attached to a ground surface. This provides a simple structure for allowing the pulley to move relative to the blade when pulled by the edgewise actuator in order to maintain tension in the first length of flexible cable. The pivot may include one or more spring elements, such as a torsion spring, which are arranged to return the moveable arm to an upright position.

The position of the pulley along the length of the moveable arm may be fixed. Preferably, the pulley is selectively movable along at least part of the length of the moveable arm to vary the vertical position of the pulley relative to the blade. Advantageously, this allows the position of the pulley to be varied prior to the test but fixed relative to the moveable arm during the test. This allows the direction of loading to be tuned to more accurately represent actual operating loads and, since the position of the pulley is fixed during the test, ensures that the loading direction does not substantially change between oscillations. Selectively moving the position of the pulley also allows for fine tuning of the loading direction. For example, it is found that applying the load at a slight angle allows for the minimisation of certain unwanted higher order oscillations.

The apparatus may be arranged to perform fatigue testing in the edgewise direction only. Alternatively, the base may be arranged to allow the blade to rotate about its longitudinal axis between tests so that the edgewise actuator assembly can be used to perform both edgewise and flapwise fatigue tests consecutively. In certain embodiments, the apparatus may comprise a flapwise actuator mounted on the blade, such as a rotating or reciprocating mass driven by a blade-mounted actuator. Preferably, the apparatus further comprises a flapwise actuator assembly comprising a ground-supported flapwise actuator arranged to cyclically deflect the blade relative to the base in the flapwise direction. Having a ground supported actuator, rather than a blade-mounted actuator, provides more freedom during test setup for fine tuning of the position of the additional weights to more accurately represent operational loading conditions. It also allows larger loads to be applied to the blade.

Preferably, the flapwise actuator comprises a linear actuator, such as a hydraulic, pneumatic or electrical actuator, pivotally attached at one of its ends to a ground surface and having a pivot at its other end for pivotal attachment to the blade. With large blades, the force required to oscillate the blade in the flapwise direction can be much larger than that required to oscillate the blade in the edgewise direction, due at least in part to the aerodynamic damping experienced by the blade in the flapwise direction. Linear actuators have a high load capability, allowing the apparatus to successfully overcome the aerodynamic damping forces experienced by the blade in the flapwise direction.

The edgewise actuator assembly, and the flapwise actuator assembly if present, may be attached to the blade during use by any suitable means, for example using one or more eyelets or threaded bolts. Preferably, the apparatus further comprises a load frame by which the edgewise actuator assembly and/or the flapwise actuator assembly is attachable to the blade, the load frame comprising at least one additional weight to simulate operational loading conditions on the blade during a fatigue test. With this arrangement, the frame spreads the deflection forces across the blade profile, rather than having point loads, and incorporating the weight into the load frame results in a simplified apparatus. In one particular embodiment, the load frame comprises a pressure side frame element and an opposing suction side frame element connected by a frame bolt extending through drill holes in the pressure and suction sides of the blade. The pressure side frame element and the suction side frame element extend along at least part of the width of the blade and preferably follow the contour profile of the blade. In alternative embodiments, the load frame may form an enclosure around the blade. The at least one additional weight may be integral with the load frame, or attached to the load frame by any suitable method, for example by gluing.

According to a second aspect of the present invention, there is provided a system for fatigue testing a wind turbine blade, the system comprising an apparatus according to any of the embodiments described above and a wind turbine blade to be tested, wherein a first end of the wind turbine blade is supported by the base of the apparatus such that the longitudinal axis and the edgewise direction of the blade are both substantially horizontal, and wherein the flexible cable arrangement of the edgewise actuator assembly is attached to the blade at a position away from the first end of the blade. Preferably, the first end of the blade corresponds to the root end of the blade.

The blade could be retained in the base such that the pressure side of the blade is facing either up or down. Preferably, the blade is retained in the base such that its pressure side is facing up and its suction side is facing down. During wind turbine operation, the mean flapwise loading tends to be towards the suction side. Thus, retaining the blade such that its suction side is facing down can provide a more representative test, since gravity will act towards the suction side of the blade causing the mean loading during the test to also act towards the suction side of the blade.

The system could be arranged such that the edgewise actuator assembly pulls towards either the trailing edge or the leading edge. Preferably, the system is arranged such that the edgewise actuator pulls towards the leading edge. During wind turbine operation, the direction of the mean loading tends to be towards the leading edge, since this is the direction of aerodynamic lift. Thus, arranging the system in such a manner can provide a more representative test.

The flexible cable assembly may be attached to the blade at any suitable position or positions along the length of the blade. For example, the flexible cable assembly may be attached close to the first end of the blade, or at or towards the tip of the blade. Where the flexible cable assembly is attached towards the first end of the blade, smaller displacements and larger forces are required, whereas where the flexible cable is attached towards the tip of the blade, larger displacements and smaller forces are required. The optimal position for the attachment of the flexible cable assembly is thus a balance between the forces and displacements required from the actuator. This may vary from blade to blade depending on the stiffness of the blade and its vibration behaviour and may also depend on the characteristics and performance of the actuator.

Where the system comprises an edgewise actuator assembly and a flapwise actuator assembly, the edgewise and flapwise actuator assemblies may be attached to the blade at the same location along the length of the blade. Preferably, the flapwise actuator assembly and the edgewise actuator assembly are attached to the blade at different locations. As the optimal position for the attachment of the edgewise and flapwise actuator assemblies is a balance between the forces and displacements required from the actuator, attaching the edgewise and flapwise actuator assemblies at different locations allows the optimal position for each actuator assembly to be selected independently.

The system could comprise one edgewise actuator assembly, or any suitable number of edgewise actuator assemblies attached along the length of the blade and deflecting the blade together. Alternatively, or in addition, the system could comprise one flapwise actuator assembly, or any suitable number of flapwise actuator assemblies attached along the length of the blade and deflecting the blade together.

According to a third aspect of the invention, there is provided a method of fatigue testing a wind turbine blade, the method comprising the steps of supporting a first end of a wind turbine blade in a base such that the longitudinal axis and the edgewise direction of the blade are both substantially horizontal, connecting the blade to a ground supported edgewise actuator using a flexible cable assembly, and cyclically deflecting the blade relative to the base in the edgewise direction by generating a cyclical deflection force with the edgewise actuator and repeatedly pulling the blade in a substantially horizontal direction with the flexible cable assembly.

As described above in relation to the apparatus of the present invention, with the method according to the present invention, the blade is not rigidly constrained to move along any particular path or paths by the edgewise actuator assembly. Instead, the flexible cable assembly allows the blade to exhibit twisting and other movements as it would do during operation. This enables a more representative test.

The flexible cable assembly may be connected to any suitable part of the blade and at any suitable position along the length of the blade. The flexible cable assembly may comprise a single length of cable extending between the blade and the edgewise actuator. Preferably, the flexible cable assembly comprises a first cable portion and a second cable portion and wherein the step of connecting the blade to the edgewise actuator is carried out by connecting the first cable portion to a pressure side of the blade and connecting the second cable portion to a suction side of the blade, in the manner of a bridle. Advantageously, this provides more even load application to the blade during the fatigue test. It also ensures that the flexible cable assembly is attached adjacent the internal load bearing structure, which is the structurally strongest part of the blade profile, without inducing excessive twisting which might otherwise occur if the flexible cable assembly is attached to only one of the pressure or suction sides.

Preferably, the flexible cable assembly comprises a first length of cable forming both the first cable portion and the second cable portion. This provides a more simple arrangement.

Preferably, the flexible cable assembly further comprises a pulley connected to the edgewise actuator, the first length of cable extending around the pulley such that it is divided into the first and second cable portions by the pulley, and wherein the step of cyclically deflecting the blade relative to the base in the edgewise direction is carried out by transmitting the cyclical deflection force to the pulley to repeatedly pull the pulley in the edgewise direction. With this arrangement, the respective lengths of the first and second cable portions are able to vary as the blade oscillates during the test to balance the tension applied to the pressure and suction sides of the blade, thus reduce twisting or jerking of the blade during the test.

The cyclical deflection force may be generated by the edgewise actuator at any suitable frequency. Preferably, the cyclical deflection force is generated by the edgewise actuator at or substantially at an edgewise resonance frequency of the blade. For example, at the first or second edgewise resonance frequency of the blade. By deflecting the blade at an edgewise resonance frequency, the force required to deflect the blade is far less than that required at other frequencies due to blade excitation, reducing the energy requirements for the test and the required load capacity of the edgewise actuator. The edgewise resonance frequency at which the test is carried out depends on the characteristics of the blade but is generally in the region of 0.6 to 1 Hz, more particularly about 0.8 Hz.

The method may be carried out such that the blade is fatigue tested in the edgewise direction only. Alternatively, the blade may be fatigue tested consecutively in the edgewise and flapwise directions using the edgewise actuator assembly by rotating the blade about its longitudinal axis between tests. Preferably, the method further comprises the steps of (i) attaching a flapwise actuator assembly to the blade at a position away from the first end of the blade, the flapwise actuator assembly comprising a ground-supported flapwise actuator; and (ii) cyclically deflecting the blade relative to the base in the flapwise direction by generating a flapwise cyclical deflection force with the ground-supported flapwise actuator and transmitting the flapwise cyclical deflection force to the blade.

The cyclical deflection force may be generated by the flapwise actuator at any suitable frequency. Preferably, the flapwise cyclical deflection force is generated at or substantially at a flapwise resonance frequency of the blade. As mentioned above in relation to the edgewise resonance frequency, deflecting the blade at a flapwise resonance frequency means that the force required to deflect the blade is far less than that required at other frequencies, reducing the energy requirements for the test and the required load capacity of the flapwise actuator. The flapwise resonance frequency at which the test is carried out depends on the characteristics of the blade but is generally in the region of 0.35 to 0.65 Hz, more particularly about 0.5 Hz. The edgewise cyclical deflection force and the flapwise cyclical deflection force may be generated at substantially the same frequency, or at different frequencies.

The steps of cyclically deflecting the blade relative to the base in the edgewise direction and cyclically deflecting the blade relative to the base in the flapwise direction may be carried out consecutively. Preferably, the steps of cyclically deflecting the blade relative to the base in the edgewise direction and cyclically deflecting the blade relative to the base in the flapwise direction are carried out simultaneously. This reduces the time taken to carry out the fatigue testing of a blade. In addition, since a blade will experience simultaneous flapwise and edgewise deflections during wind turbine operation, the test can be more representative of operational loading conditions.

BRIEF DESCRIPTION OF THE DRAWINGS

The invention will now be further described by way of example only and with reference to the accompanying figures in which.

DETAILED DESCRIPTION

Figure 1:
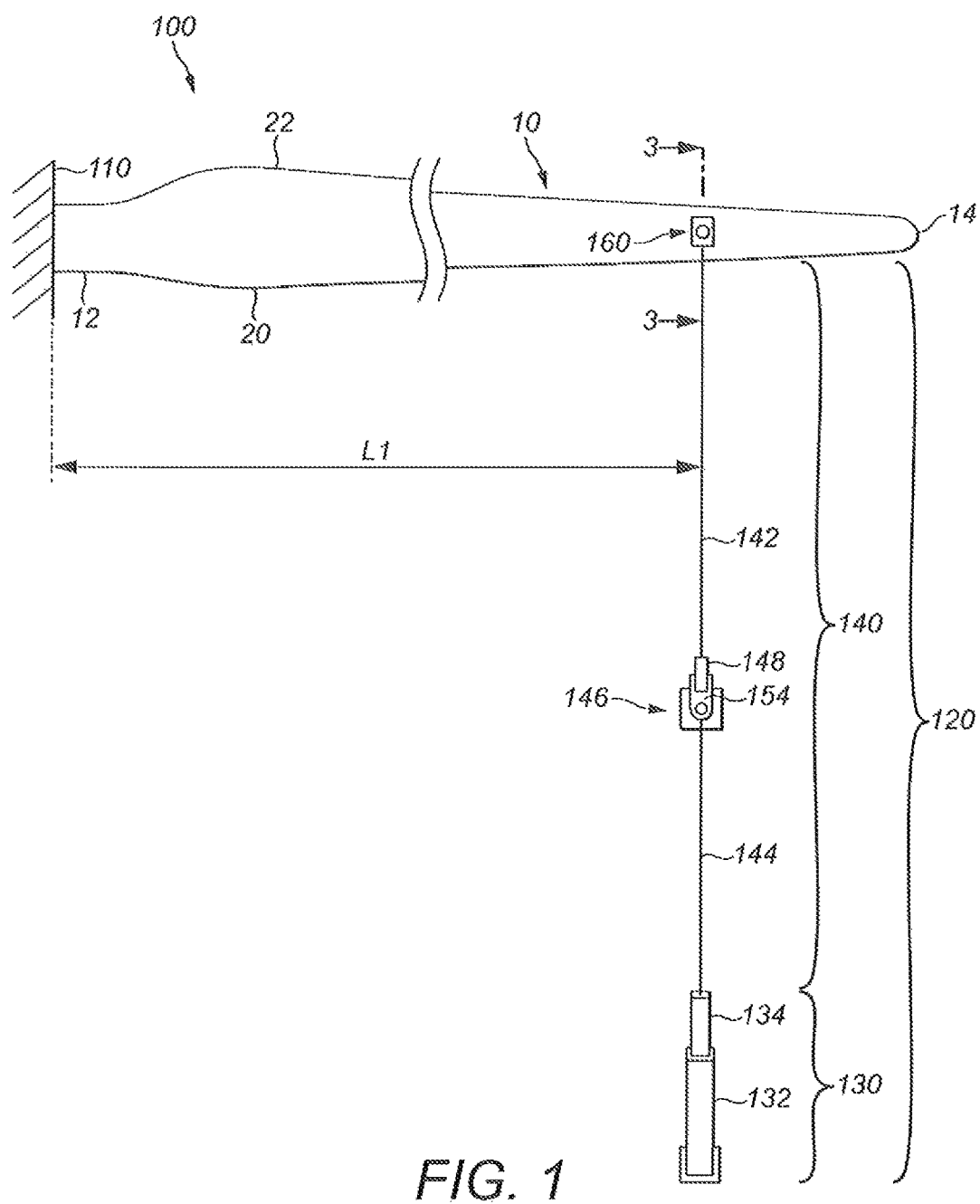
FIG. 1 is a schematic top view of a first example of test apparatus according to the invention, showing the apparatus attached to a wind turbine blade.
Figure 2:
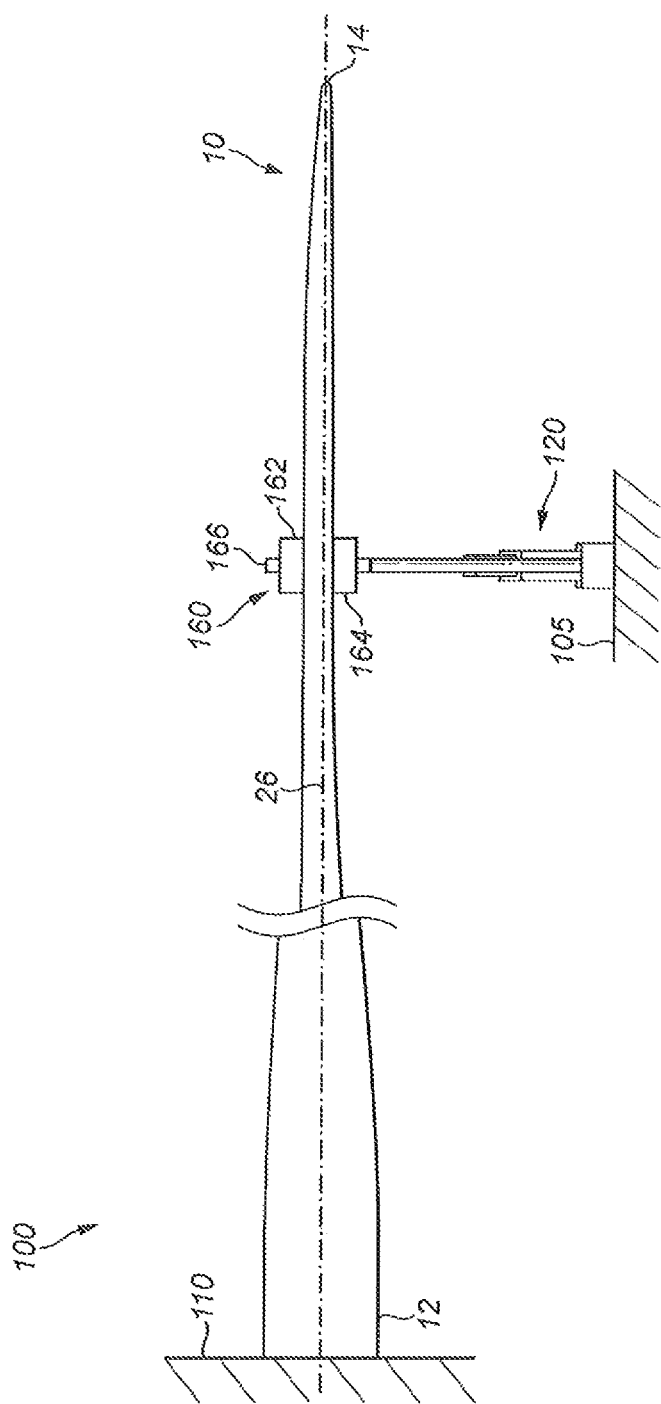
FIG. 2 is a schematic side view of the test apparatus of FIG. 1.
Figure 3:
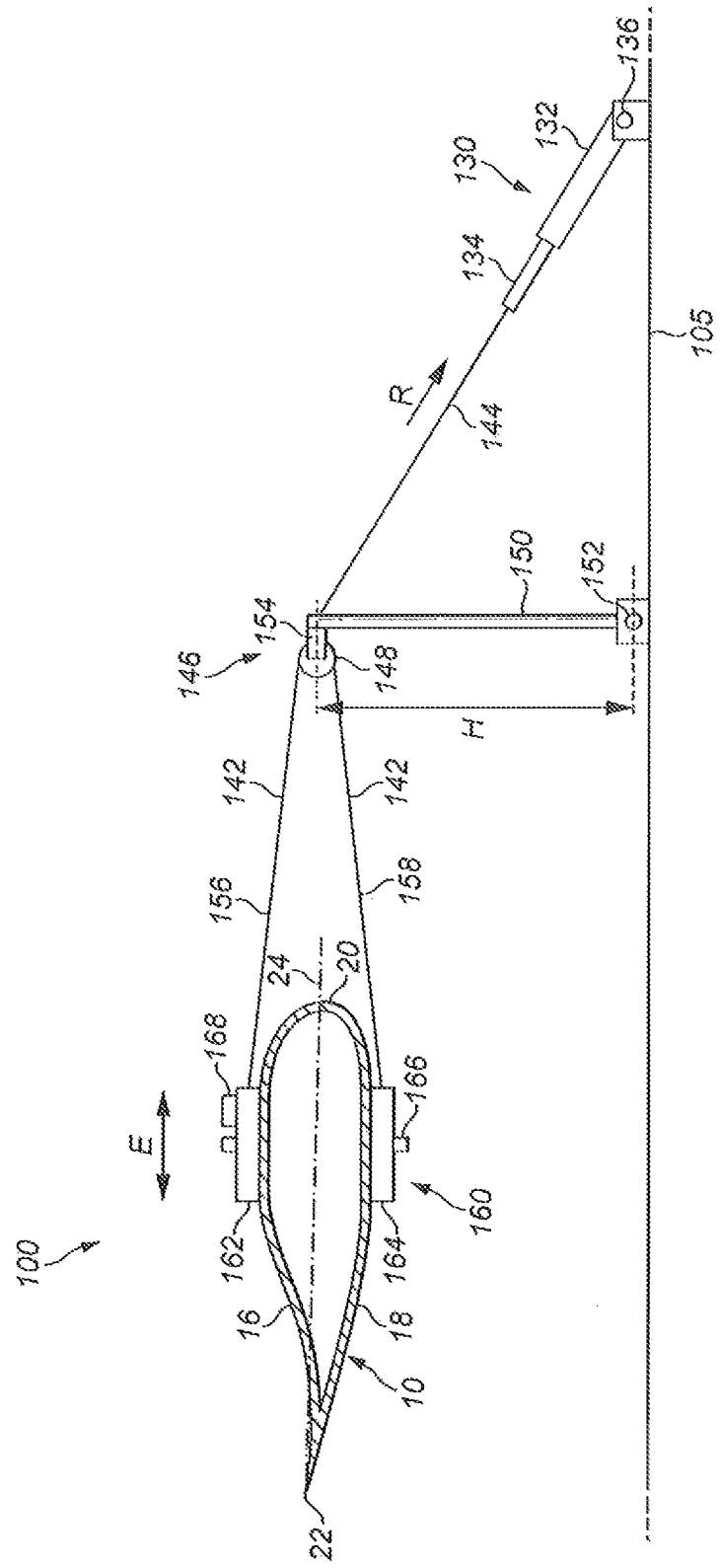
FIG. 3 is a schematic cross-sectional view taken through the line 3-3 in FIG. 1.

FIGS. 1 to 3 show a first test apparatus 100 for fatigue testing a wind turbine blade 10 to which the apparatus 100 is attached. The wind turbine blade 10 has a root end 12 and an opposed tip end 14. Between the root end 12 and the tip end 14 is an airfoil region having a profiled contour that comprises a pressure side 16 and a suction side 18, as well as a leading edge 20 and a trailing edge 22. An edgewise direction 24 extends between the leading and trailing edges 20, 22. The edgewise direction 24 may change along the length of the blade 10 as the shape of the blade 10 twists between the root end 12 and the tip end 14.

The test apparatus 100 comprises a base 110 and an edgewise actuator assembly 120. The base 110 comprises a fixed support structure which is mounted on a ground surface 105 of the apparatus 100, such as a steel hub that is mounted into the floor, and on which is provided a rigid mount (not shown) for fixedly supporting the root end 12 of the blade 10. As shown in FIGS. 2 and 3, the blade 10 is supported by the base 110 such that the edgewise direction 24 and the longitudinal axis 26 of the blade 10 are substantially horizontal and such that the pressure side 16 of the blade 10 is facing upwards while the suction side 18 of the blade 10 is facing downwards. The rigid mount may comprise any suitable connection means. For example, the rigid mount may comprise a plurality of threaded bolts extending from the support structure which are screwed into corresponding threaded bolt holes (not shown) at the root end 12 of the blade 10.

The edgewise actuator assembly 120 includes an edgewise actuator 130 and a flexible cable assembly 140 connecting the edgewise actuator 130 to the blade 10 via a first load frame 160, as described below.

In this example, the edgewise actuator 130 comprises a linear actuator having a cylinder 132 and a piston 134 that is slidable within the cylinder 132. However, the edgewise actuator may comprise any suitable actuator, for example a rotary actuator. The edgewise actuator 130 is articulated to the ground surface 105 of the apparatus 100 by a pivot 136 to which the cylinder 132 is attached. In FIG. 3, the piston 134 is shown in a mid-stroke position, i.e. mid way between the fully retracted and fully extended positions. In this position, the flexible cable assembly 140 is under tension but the blade 10 is undeflected.

The flexible cable assembly 140 comprises a first length of flexible cable, or cable bridle 142, connected to the blade 10, a second length of flexible cable 144 connected to the edgewise actuator 130 and a pulley mechanism 146 positioned between the bridle 142 and the second length of flexible cable 144.

The pulley mechanism 146 includes a pulley 148 mounted on a moveable arm 150. The moveable arm 150 extends upwards from the ground surface 105 and is articulated to the ground surface 105 by a pivot 152. The pulley 148 is rotatably attached to the moveable arm 150 by an adjustable strut 154 attached at a position H along the length of the moveable arm 150. In this example, the adjustable strut 154 includes a locking pin (not shown) which engages with one or more corresponding adjustment holes (not shown) which are arranged along the length of the moveable arm 150. The position H of the pulley 148 along the length of the arm 150 can be selectively adjusted by removing the locking pin from the moveable arm 150, moving the strut 154 to a new position and adjacent to an adjustment hole and inserting the locking pin into the adjustment hole at the new position. However, any suitable adjustment mechanism could be used for the rotatable attachment of the pulley 148 to the arm 150.

The bridle 142 extends around the pulley 148 and is divided by the pulley 148 into a first cable portion 156 and a second cable portion 158. The first cable portion 156 is connected to the pressure side 16 of the blade 10 at a first end of the bridle 142 and the second cable portion 158 is connected to the suction side 18 of the blade 10 at a second end of the bridle 142 using the first load frame 160, as discussed below.

The first load frame 160 comprises a pressure side frame element 162 and a suction side frame element 164 connected by a frame bolt 166 extending through drill holes in the pressure and suction sides 16, 18 of the blade 10. The pressure side frame element 162 and the suction side frame element 164 extend across part of the width of the blade and follow the contour profile of the blade 10. The pressure side frame element 162 and the suction side frame element 164 each include one or more cable mounting points (not shown) by which the first and second portions 156, 158 of the bridle 142 are attached under tension. The first load frame 160 also includes an additional weight 168 that is glued to the pressure side frame element 162 to simulate operating loads. The additional weight 168 could instead by attached to the suction side frame element 164, or to another part of the apparatus, or to the blade itself. Further additional weights (not shown) can be also attached to the first load frame 160 or directly or indirectly to the blade 10 at other locations.

The first load frame 160 is attached to the blade 10 at a distance L1 from the root end 12 of the blade 10. As discussed above, the optimal position for the attachment of the edgewise actuator assembly 120 depends on the stiffness and vibration characteristics of the blade and on the characteristics of the actuator itself.

The second length of flexible cable 144 is fixedly attached at its first end to the moveable arm 150 and is fixedly attached at its second end to the piston 134 of the ground-supported edgewise actuator 130. The second length of flexible cable 144 thus extends between the edgewise actuator 130 and the pulley mechanism 146.

In use, the piston 134 is reciprocated relative to the cylinder 132 by an actuator drive means (not shown), such as a hydraulic or pneumatic pump, or an electrical power source, to generate a cyclical deflection force which is transmitted to the blade by the flexible cable assembly 140. During each cycle, the piston 134 is alternately retracted away from the pulley mechanism 146 and extended towards the pulley mechanism 146 by the actuator drive means.

During each retraction stroke, as indicated by arrow R in FIG. 3, the piston 134 pulls on the second length of flexible cable 144 to pivot the arm 150 towards the edgewise actuator 130. As the arm 150 pivots towards the edgewise actuator 130, the pulley 148 moves away from the blade 10 in the edgewise direction and pulls on the first and second cable portions 156, 158 of the harness 142 to deflect the blade 10 in the edgewise direction. The respective lengths of the first and second cable portions 156, 158 are allowed to adjust through movement over the pulley 148 to balance the tension in both of the first and second cable portions 156, 158. In this manner, the blade 10 can twist about its longitudinal axis and to move in the flapwise direction without being rigidly constrained by the flexible cable assembly 140.

During each extension stroke, the piston 134 moves towards the pulley mechanism until it reaches its fully extended position. As the bridle 142 and the second length of cable 144 are flexible, the blade 10 is free to return through its undeflected position and to deflect in the edgewise direction away from the actuator under the action of its own stiffness. As with the deflection of the blade 10 during each retraction stroke, the blade 10 can twist about its longitudinal axis and to move in the flapwise direction without being rigidly constrained by the flexible cable assembly 140.

At start-up, the cyclical deflection force generated by the edgewise actuator 130 is steadily increased from zero until it reaches its operating frequency at an edgewise resonance frequency of the blade, at which it remains for the duration of the test. The edgewise resonance frequency value depends on the characteristics of the blade and is generally in the region of 0.6 to 1.0 Hz, more particularly about 0.8 Hz. As a result, the blade is excited and deflects in the edgewise direction both towards and away from the edgewise actuator, despite the fact that the cyclical deflection force is applied only towards the edgewise actuator. The excitation of the blade generates bending loads which are far greater than the deflection load applied to the blade by the edgewise actuator. The cyclical deflection force is applied only to initiate and maintain an excited state.

In this manner, the blade 10 is cyclically deflected in the edgewise direction, as indicated by arrow E in FIG. 3, but is able to twist and move in other directions during the test. Consequently, the apparatus 100 can exert stresses and strains on the blade 10 which are more representative of actual operating conditions.

Figure 4:
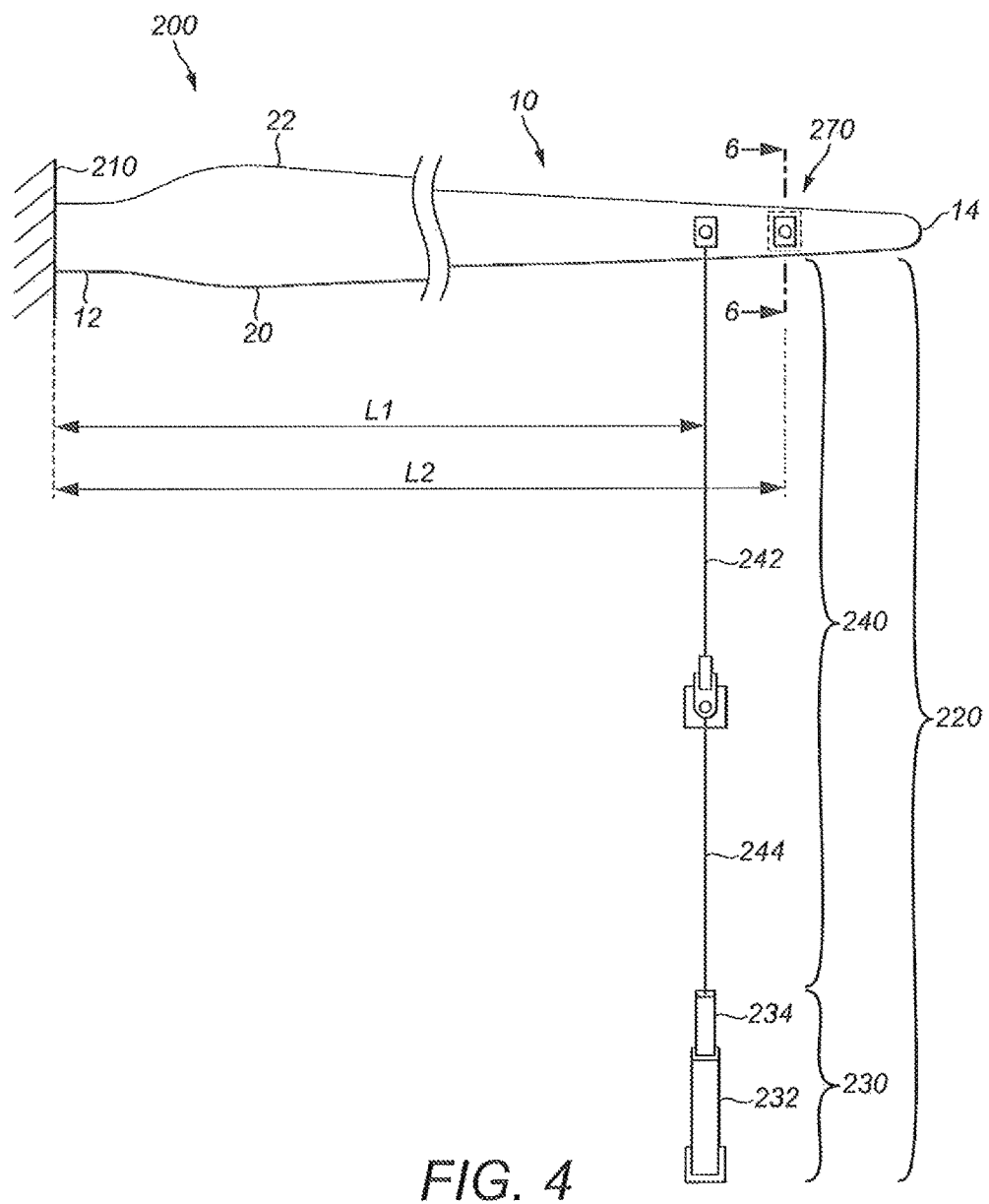
FIG. 4 is a schematic top view of a second example of test apparatus according to the invention, showing the apparatus attached to a wind turbine blade.
Figure 5:
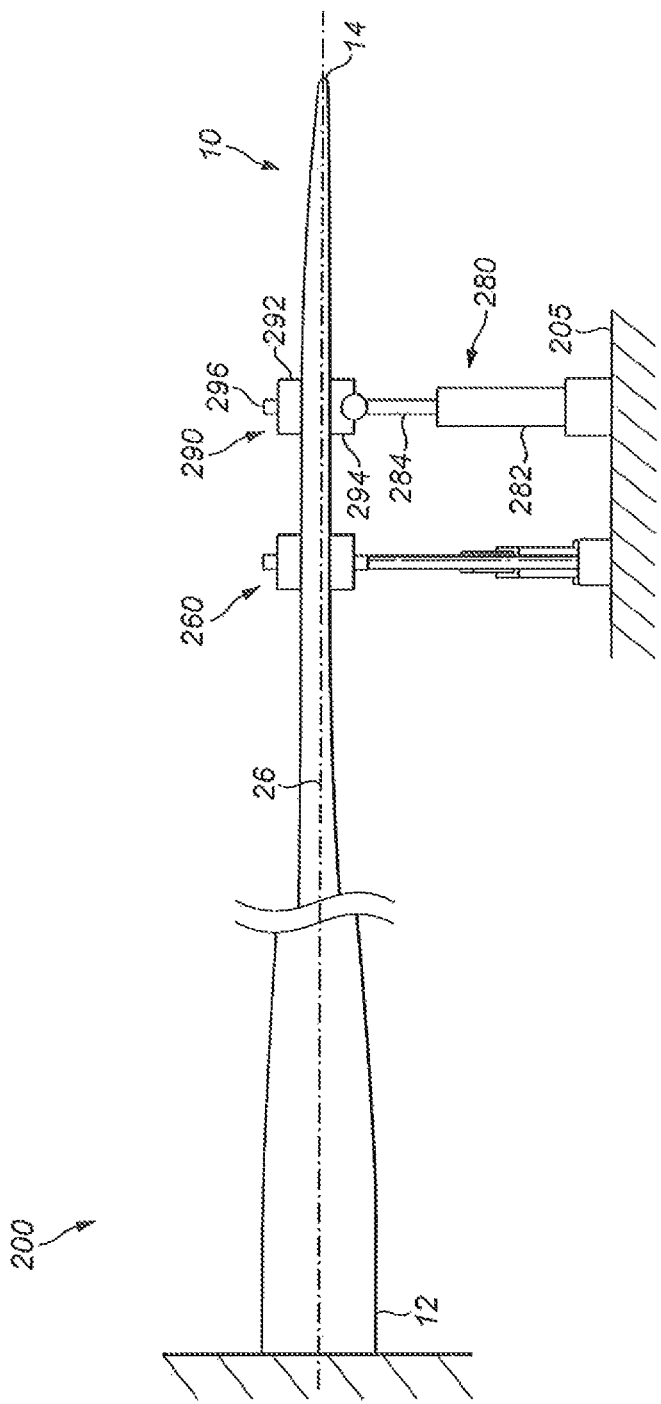
FIG. 5 is a schematic side view of the test apparatus of FIG. 4.
Figure 6:
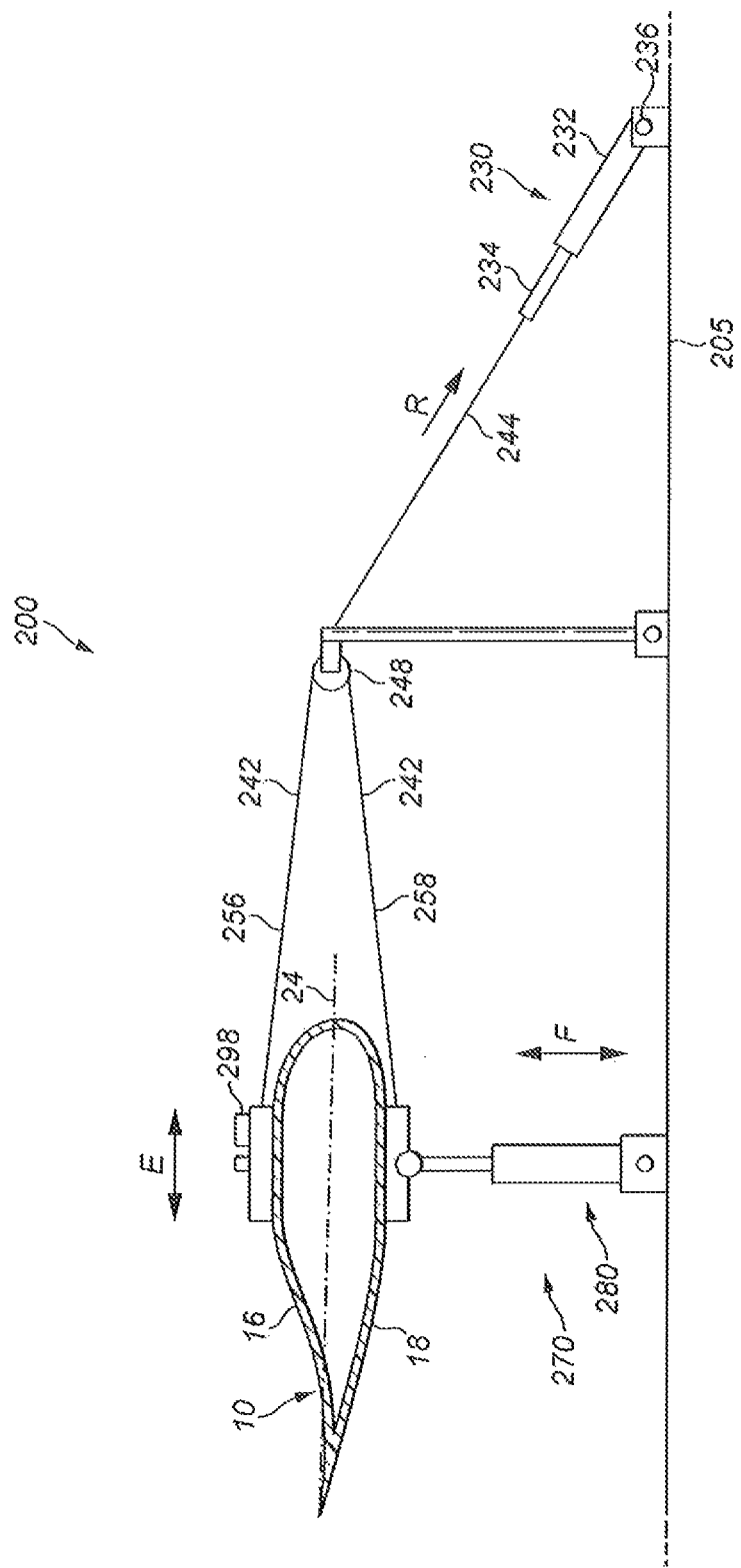
FIG. 6 is a schematic cross-sectional view taken through the line 6-6 in FIG. 4.

FIGS. 4 to 6 show a second test apparatus 200 for fatigue testing a wind turbine blade 10 to which the apparatus 200 is attached. The test apparatus 200 is similar to the test apparatus 100 shown in FIGS. 1 to 3. However, in addition to the edgewise actuator assembly 220, the test apparatus 200 also includes a flapwise actuator assembly 270 for cyclically deflecting the blade 10 in the flapwise direction.

The flapwise actuator assembly 270 includes a flapwise actuator 280 and a second load frame 290 connected to the flapwise actuator 280 and to the blade 10.

The flapwise actuator 280 comprises a linear actuator having a cylinder 282 and a piston 284 that is slidable within the cylinder 282. The flapwise actuator 280 is articulated to the ground surface 205 at one of its ends by a first pivot 286, to which the cylinder 282 is attached, and is articulated to the load frame 290 at its other end by a second pivot 288, to which the piston 284 is attached. In FIGS. 4 and 5, the piston 284 is shown in a mid-stroke position, i.e. mid way between the fully retracted and fully extended positions. In the mid-stroke position, the blade 10 is undeflected by the flapwise actuator 280.

As with the first load frame 260, the second load frame 290 comprises a pressure side frame element 292 and a suction side frame element 294 connected by a frame bolt 296 extending through drill holes in the pressure and suction sides 16, 18 of the blade 10. The pressure side frame element 292 and the suction side frame element 294 extend across part of the width of the blade and follow the contour profile of the blade 10. The suction side frame element 294 includes a mounting point (not shown) by which the flapwise actuator 280 is pivotally attached to the second load frame 290 by the second pivot 288. The second load frame 290 also includes an additional weight 298 that is glued to the pressure side frame element 292 to simulate operating loads. The additional weight 298 could instead by attached to the suction side frame element 294, or to another part of the apparatus, or to the blade itself. Further additional weights (not shown) can be also attached to the first load frame 260, the second load frame 290 or directly or indirectly to the blade 10 at other locations.

The second load frame 290 is attached to the blade 10 at a distance L2 from the root end 12 of the blade 10. As with the edgewise actuator 230, the optimal position for the attachment of the flapwise actuator 280 depends on the stiffness and vibration characteristics of the blade and on the characteristics of the actuator itself. In this example, L2 is greater than L1, such that the flapwise actuator assembly 270 is attached to the blade closer to the tip end 14 than the edgewise actuator assembly 220.

In use, as with the first test apparatus 100, the piston 234 of the edgewise actuator 230 of the second test apparatus 200 is reciprocated relative to the cylinder 232 to generate a cyclical deflection force during each retraction stroke, as indicated by arrow R in FIG. 6, to pull the blade 10 in the edgewise direction towards the edgewise actuator 230. The respective lengths of the first and second cable portions 256, 258 are allowed to adjust through movement over the pulley 248 to balance the tension in both of the first and second cable portions 256, 258. As with the first apparatus 100, the blade 10 is free to return to its undeflected position and to deflect in the edgewise direction away from the actuator under the action of its own stiffness during each extension stroke of the edgewise actuator 230. In this manner, the blade 10 is cyclically deflected in the edgewise direction, as indicated by arrow E in FIG. 6, and is free to twist about its longitudinal axis without being rigidly constrained by the flexible cable assembly 240.

Simultaneously, the piston 284 of the flapwise actuator 280 is reciprocated relative to the cylinder 284 by a flapwise actuator drive means (not shown) such as a hydraulic or pneumatic pump, or an electrical power source, to generate a cyclical flapwise deflection force which is transmitted to the blade. During each reciprocation of the flapwise actuator 280, the piston 284 is alternately retracted away from and extended towards the blade 10 by the flapwise actuator drive means to cyclically deflect the blade 10 relative to the base 210 in the flapwise direction, as indicated by arrow F in FIG. 6.

At start-up, the edgewise cyclical deflection force generated by the edgewise actuator 230 is steadily increased from zero until it reaches its operating frequency at an edgewise resonance frequency of the blade, at which it remains for the duration of the test. The edgewise resonance frequency value depends on the characteristics of the blade and is generally in the region of 0.6 to 1.0 Hz, more particularly about 0.8 Hz.

Simultaneously, the flapwise cyclical deflection force generated by the flapwise actuator 280 is steadily increased from zero until it reaches its operating frequency at an flapwise resonance frequency of the blade, at which it remains for the duration of the test. The flapwise resonance frequency value depends on the characteristics of the blade and is generally in the region of 0.35 to 0.65 Hz, more particularly about 0.5 Hz. As a result, the blade is excited in the flapwise direction by the flapwise actuator and in the edgewise direction by the edgewise actuator.

In this manner, the blade 10 is cyclically and simultaneously deflected in both the edgewise and the flapwise directions. This allows the edgewise and flapwise fatigue tests to be carried out concurrently, reducing the time required to perform fatigue testing of the blade. In addition, as the edgewise actuator 230 is attached to the blade 10 by the flexible cable assembly 240 and the flapwise actuator 280 is pivotally attached to both the blade 10 and to the ground surface 205, the blade 10 is able to twist and move more freely than during comparable tests. Consequently, the apparatus 200 can exert stresses and strains on the blade 10 during the test which are more representative of actual operating conditions.

In both of the above embodiments, by adapting the edgewise actuator and the flexible cable assembly to deflect the blade in the edgewise direction by applying a substantially horizontal force, edgewise fatigue testing can be carried out with the blade supported such its edgewise direction is substantially horizontal. In this position, the peak strain values at the leading and trailing edges are lower and more representative of the loads and R-values, that being the ratio of the minimum to maximum stresses experienced during operation in comparison to conventional apparatuses in which the edgewise direction of the blade is substantially vertical. This improves the accuracy of the test results and reduces the reliance on material data extrapolation when calculating expected fatigue life. It can also reduce "over engineering" of the blade from seeking to prevent edge buckling which may occur during less representative tests in which the edge strains are higher. Not only are the peak strain values lower for the blade being tested, but the mean loads and peak moments experienced by the test apparatus are also lower, leading to lower wear of test apparatus components. This can extend the life of the test apparatus and reduce the maintenance requirements.

It will be appreciated that various modifications to the embodiments described above are possible and will occur to those skilled in the art without departing from the scope of the invention which is defined by the following claims.

The invention claimed is:

1. An apparatus for fatigue testing a wind turbine blade, the apparatus comprising:

a base for supporting a first end of the wind turbine blade such that a longitudinal axis and an edgewise direction of the blade are both substantially horizontal; and an edgewise actuator assembly comprising a ground supported edgewise actuator and a flexible cable assembly for connecting the edgewise actuator to the blade, wherein the edgewise actuator and the flexible cable assembly are adapted to cyclically deflect the blade relative to the base in the edgewise direction by repeatedly pulling the blade in a substantially horizontal direction.

2. The apparatus according to claim 1, wherein the flexible cable assembly comprises a first cable portion for connecting the edgewise actuator to a pressure side of the blade and a second cable portion for connecting the edgewise actuator to a suction side of the blade.

3. The apparatus according to claim 2, wherein the flexible cable assembly comprises a first length of cable forming both the first cable portion and the second cable portion.

4. The apparatus according to claim 3, wherein the flexible cable assembly further comprises a pulley connected to the edgewise actuator and wherein the first length of cable extends around the pulley such that the first length of cable is divided into the first and second cable portions by the pulley.

5. The apparatus according to claim 4, wherein the pulley is mounted on a moveable arm, the moveable arm being pivotally attached to a ground surface.

6. The apparatus according to claim 5, wherein the pulley is selectively movable along at least part of the length of the moveable arm to vary the vertical position of the pulley relative to the blade.

7. The apparatus according to claim 4, wherein the flexible cable assembly further comprises a second length of cable extending between the edgewise actuator and the pulley.

8. The apparatus according to claim 1, further comprising a flapwise actuator assembly comprising a ground supported flapwise actuator arranged to cyclically deflect the blade relative to the base in a flapwise direction.

9. The apparatus according to claim 8, wherein the flapwise actuator comprises a linear actuator pivotally attached at one of its ends to a ground surface and having a pivot at its other end for pivotal attachment to the blade.

10. The apparatus according to claim 1, further comprising a load frame by which the edgewise actuator assembly and/or a flapwise actuator assembly is attachable to the blade, the load frame comprising at least one additional weight to simulate operational loading conditions on the blade during a fatigue test.

11. A system for fatigue testing a wind turbine blade, the system comprising the apparatus according to claim 1 and a wind turbine blade to be tested, wherein a first end of the wind turbine blade is supported by the base of the apparatus such that the longitudinal axis and the edgewise direction of the blade are both substantially horizontal, and wherein the flexible cable assembly of the edgewise actuator assembly is attached to the blade at a position away from the first end of the blade.

12. A method of fatigue testing a wind turbine blade, the method comprising the steps of:

supporting a first end of a wind turbine blade in a base such that a longitudinal axis and an edgewise direction of the blade are both substantially horizontal;

connecting the blade to a ground supported edgewise actuator using a flexible cable assembly; and cyclically deflecting the blade relative to the base in the edgewise direction by generating a cyclical deflection force with the edgewise actuator and repeatedly pulling the blade in a substantially horizontal direction with the flexible cable assembly.

13. The method of fatigue testing a wind turbine blade according to claim 12, wherein the flexible cable assembly comprises a first cable portion and a second cable portion and wherein step of connecting the blade to the edgewise actuator is carried out by connecting the first cable portion to a pressure side of the blade and attaching the second cable portion to a suction side of the blade.

14. The method of fatigue testing a wind turbine blade according to claim 13, wherein the flexible cable assembly comprises a first length of cable forming both the first cable portion and the second cable portion.

15. The method of fatigue testing a wind turbine blade according to claim 14, wherein the flexible cable assembly further comprises a pulley connected to the edgewise actuator the first length of cable extending around the pulley such that it is divided into the first and second cable portions by the pulley, and wherein the step of cyclically deflecting the blade relative to the base in the edgewise direction is carried out by transmitting the cyclical deflection force to the pulley to repeatedly pull the pulley in a substantially horizontal direction.

16. The method of fatigue testing a wind turbine blade according to claim 15, wherein the flexible cable assembly further comprises a second length of cable extending between the edgewise actuator and the pulley, and wherein transmitting the cyclical deflection force to the pulley is performed via the second length of cable.

17. The method of fatigue testing a wind turbine blade according to claim 12, wherein the cyclical deflection force is generated by the edgewise actuator at or substantially at an edgewise resonance frequency of the blade.

18. The method of fatigue testing a wind turbine blade according to claim 12, further comprising the steps of:
attaching a flapwise actuator assembly to the blade at a position away from the first end of the blade, the flapwise actuator assembly comprising a ground supported flapwise actuator; and
cyclically deflecting the blade relative to the base in a flapwise direction by generating a flapwise cyclical deflection force with the ground supported flapwise actuator and transmitting the flapwise cyclical deflection force to the blade.

19. The method of fatigue testing a wind turbine blade according to claim 18, wherein the flapwise cyclical deflection force is generated at or substantially at a flapwise resonance frequency of the blade.

20. The method of fatigue testing a wind turbine blade according to claim 18, wherein the steps of cyclically deflecting the blade relative to the base in the edgewise direction and cyclically deflecting the blade relative to the base in the flapwise direction are carried out simultaneously.

\* \* \* \* \*